United States Patent

Roulet

(10) Patent No.: US 6,330,506 B1
(45) Date of Patent: Dec. 11, 2001

(54) PROCESS FOR AUTOMATICALLY CONTROLLING THE SPEED OF A MOTOR VEHICLE

(75) Inventor: Tobias Roulet, Leonberg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/484,010

(22) Filed: Jan. 18, 2000

(30) Foreign Application Priority Data

Jan. 16, 1999 (DE) .............................. 199 01 527

(51) Int. Cl.$^7$ .................. G06F 7/00; B60T 8/32
(52) U.S. Cl. .............................. 701/93; 180/170
(58) Field of Search .................. 701/93, 94, 95, 701/96, 110; 180/170, 179, 167, 178, 197, 171; 123/198 D, 360, 399, 350

(56) References Cited

U.S. PATENT DOCUMENTS

| | | | |
|---|---|---|---|
| 4,293,844 | * 10/1981 | Ruhl | 340/439 |
| 4,541,052 | 9/1985 | McCulloch | 701/110 |
| 4,591,986 | * 5/1986 | Nakajima et al. | 701/93 |
| 4,598,370 | * 7/1986 | Nakajima et al. | 701/93 |
| 4,856,609 | * 8/1989 | Naito | 180/179 |
| 4,943,923 | * 7/1990 | Naito | 701/93 |
| 4,960,182 | * 10/1990 | Mimura et al. | 180/179 |
| 4,967,357 | * 10/1990 | Mimura et al. | 701/97 |
| 4,989,149 | * 1/1991 | Mimura et al. | 701/95 |
| 5,012,418 | 4/1991 | Petzold | 701/93 |
| 5,508,925 | 4/1996 | Katayama et al. | 701/93 |
| 5,680,309 | * 10/1997 | Rauznitz et al. | 701/93 |
| 5,758,306 | * 5/1998 | Nakamura | 701/93 |
| 5,854,989 | * 12/1998 | Speck et al. | 701/93 |
| 5,992,551 | * 11/1999 | Frey et al. | 180/179 |
| 6,104,976 | * 8/2000 | Nakamura | 701/95 |
| 6,138,071 | * 10/2000 | Sekine et al. | 701/93 |

FOREIGN PATENT DOCUMENTS 28 42 023   4/1980 (DE) .
196 27 727   1/1998 (DE) .

* cited by examiner

Primary Examiner—Jacques H. Louis-Jacques
(74) Attorney, Agent, or Firm—Crowell & Moring LLP

(57) ABSTRACT

In a process for automatically controlling the speed of a motor vehicle, the vehicle speed is controlled to a definable desired speed ($v_{des}$). When a speed change is initiated by the driver, the control event is canceled and, after the conclusion of the speed change, a new desired speed ($v_{des-new}$) is detected as a controlled variable. The amount of the actual acceleration ($|a_{act}|$) is then compared with the amount of a definable reference acceleration ($|a_{act}| < |a_{ref}|$). The momentary speed at the point in time when the amount of the actual acceleration ($|a_{act}|$) is less than or equal to the amount of the definable reference acceleration ($|a_{ref}|$) is stored as the new desired speed ($v_{des-new}$), which can be corrected as a function of operating parameters.

14 Claims, 3 Drawing Sheets

PROCESS FOR AUTOMATICALLY CONTROLLING THE SPEED OF A MOTOR VEHICLE

BACKGROUND AND SUMMARY OF THE INVENTION

This application claims the priority of German Application No. 199 01 527.9, filed Jan. 16, 1999, the disclosure of which is expressly incorporated by reference herein.

The present invention relates to a process for automatically controlling the speed of a motor vehicle.

In modern vehicles, cruise controls are increasingly used for increasing the driver's comfort and ensuring that the vehicle maintains a definable desired speed without any further intervention by the driver. In this case, the desired speed can be set, for example, on straight routes in a fuel consumption-optimized manner or as a function of speed limitations.

From German Published Patent Application DE-OS 2842023, a cruise control device is known. This device sets the desired driving speed by way of an analysis of the desired speed and the actual speed by influencing the engine power. In this case, a time-variable desired speed is provided in dynamic operating conditions, such as acceleration and deceleration, which leads the vehicle (by means of a defined acceleration or deceleration) to the desired or stored desired value.

From German Patent Document DE 196 27 727 A1, a process is also known for controlling the speed of a vehicle. Here, the vehicle speed is controlled according to a desired speed defined by the driver and the actual speed. After the control is switched off, the driver can resume the control by means of the originally stored speed. In at least one operating situation, the resumption of the original desired speed is delayed. This known solution ensures that the driver and the subsequent traffic is not irritated by unmotivated deceleration operations, which, le particularly in the case of cruise controls with a braking intervention as often implemented in the adaptive cruise control device, leads to considerable loss of comfort.

In the case of known cruise controls, it is possible that the cruise control device is temporarily switched off in a particular operating condition, preferably in the case of a deceleration or acceleration, and the vehicle moves at a significantly higher speed than was implemented during the preceding control operation. If, after the acceleration event or a possible deceleration event, the driver wants to drive the vehicle at the again newly reached speed, he must again store this speed in the cruise control device.

By means of the process according to the invention, it is ensured that a new desired speed is automatically detected by the control unit without additional programming efforts on the part of the driver and is defined as the new target value to be controlled. The actual acceleration is monitored by a comparison of the amount of the actual acceleration with the amount of a reference acceleration for detecting the termination of the event of the speed change. This has the advantage that no additional action by the driver is required. On the basis of the comparison, the control unit automatically recognizes the point in time at which the desired speed change is concluded and stores the momentary speed as the new desired speed.

As the result of the characteristics described herein, additional advantageous further developments and improvements of the process according to the invention are achieved.

The end of the speed change will be recognized when, within a definable time after letting go of an operating unit for the speed change, no new operation of the operating unit takes place. This has the advantage that there is no reaction to every possibly unintentional accelerator pedal or brake pedal movement by the driver.

Another advantage is the fact that, after the conclusion of the speed change, a definable time period is started. Only after the expiration of this definable time period ($t_1$) is the momentary speed ($v_{mom}$) detected as the new desired speed ($v_{des-new}$). In this manner, the transient phenomenon of the constant-speed maintaining device leading to the new desired speed takes place without any bucking noticeable to the driver. The driving comfort is therefore clearly increased.

Another advantage is achieved when the momentary speed ($v_{mom}$) is acted upon by a definable, preferably operating-point-dependent speed difference (v). This adaptively corrected speed is stored as a new desired speed ($V_{des-new}$) because the vehicle handling is very well adapted thereby to the actual demands.

Other objects, advantages and novel features of the present invention will become apparent from the following detailed description of the invention when considered in conjunction with the accompanying drawings.

DETAILED DESCRIPTION OF THE DRAWINGS

Figure 1:
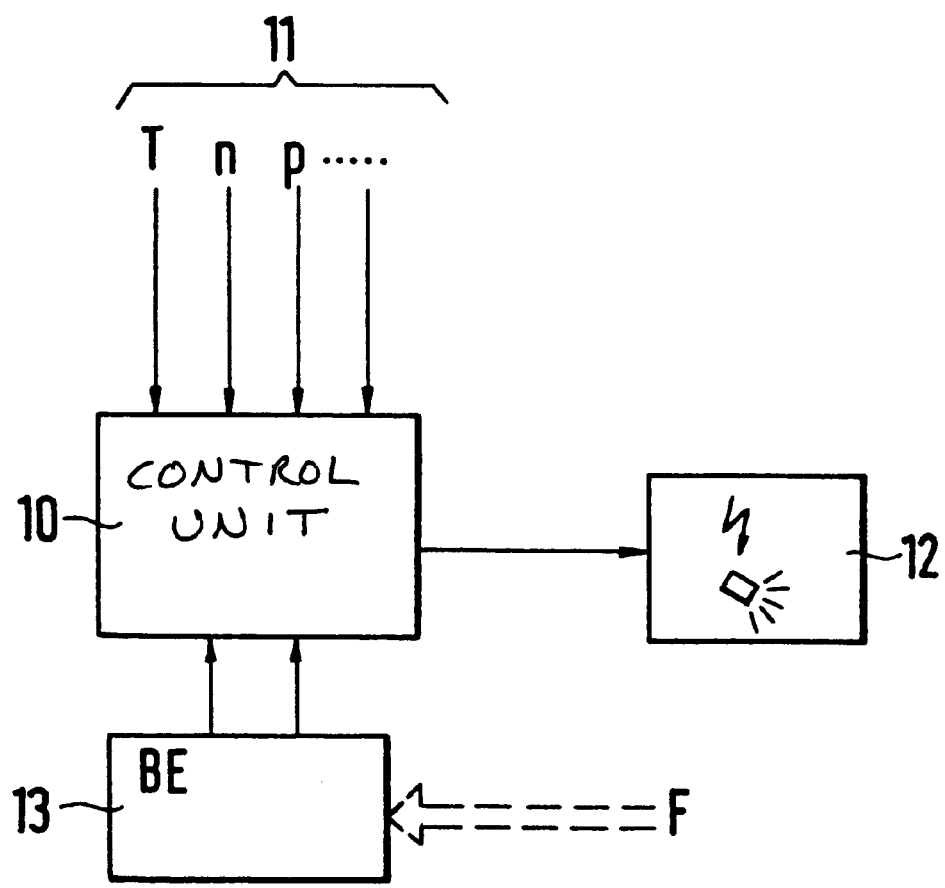
FIG. 1 is a schematic block diagram showing the basic construction of an arrangement for carrying out the process according to the invention.

FIG. 1 shows a control unit 10 for controlling the ignition and injection control operations in a motor vehicle. Such control units are known, for example, on the basis of the Motronic ignition and injection control unit of Bosch Co. so that their basic construction will be explained here only to the extent necessary with respect to the process according to the present invention. The operating parameters, such as the temperature T, the pressure p and the engine rotational speed n, which are detected by sensors (not shown), are supplied to the control unit 10 as input quantities 11. By means of the detected operating parameters, the corresponding actuating variables, for example for actuating the injection and the ignition, are computed in the control unit 10 by means of stored characteristic diagrams. The computed actuating variables are then supplied to corresponding actuators 12 and thus to the peripheral components of the motor vehicle.

In FIG. 1, reference number 13 indicates an operating unit BE. This operating unit may, for example, be an accelerator pedal or a brake pedal. When the operating unit BE is operated by a driver F, who is indicated symbolically, this is recognized in the control unit 10 and the change in the speed desired by the driver is implemented. In the event that no speed change was initiated, the speed of the motor vehicle, as known, is controlled to the desired value by way of a desired—actual comparison.

Figure 2:
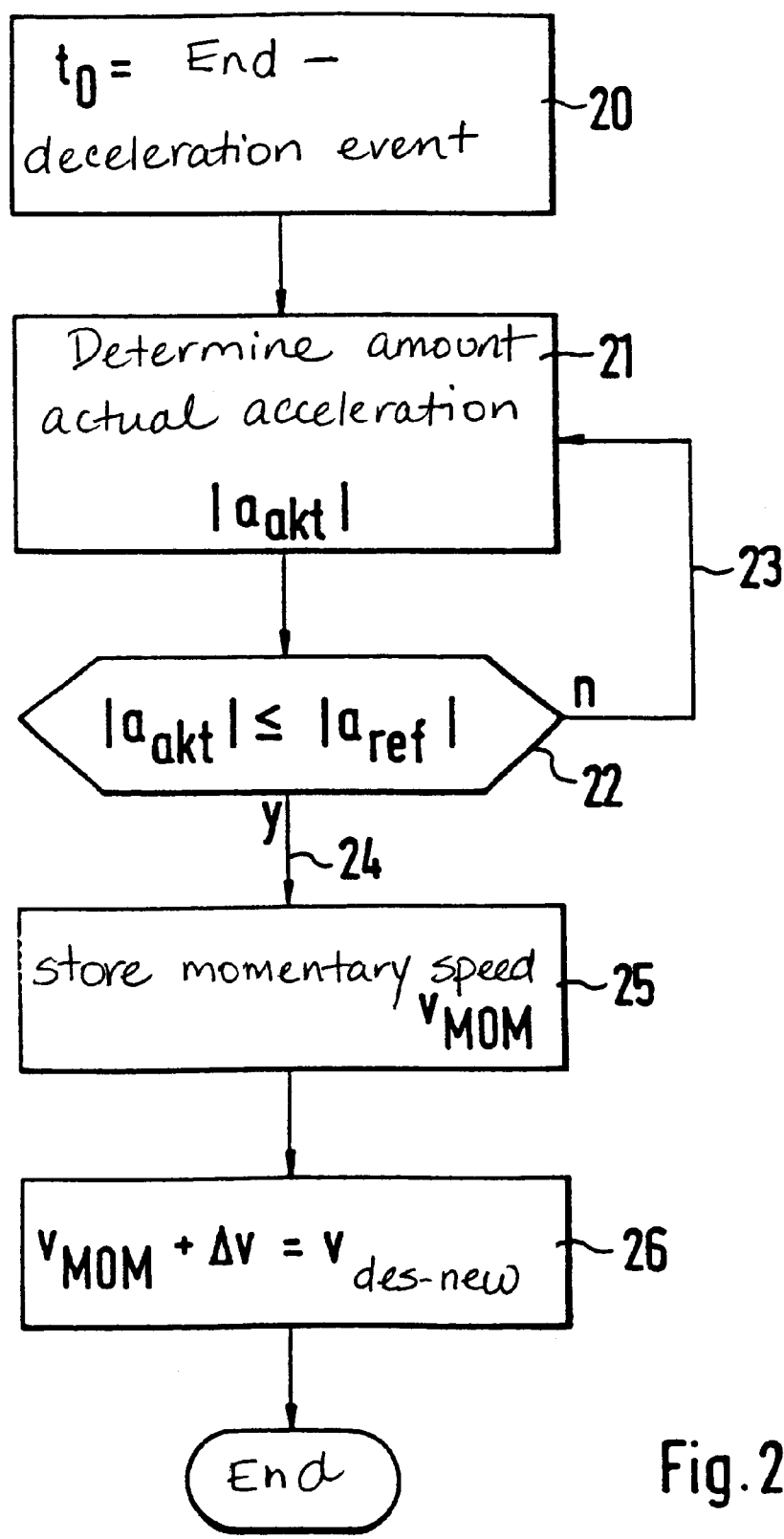
FIG. 2 is a flow chart illustrating the processing in the control unit at negative acceleration.

By means of the flow chart of FIG. 2, the process according to the invention will be explained for after a deceleration desired by the driver. In a first program step 20, the end of the deceleration operation is recognized and a point in time $t_0$ is defined thereby. For recognizing the deceleration operation, the process monitors whether the operating unit BE, for example, the brake pedal, is operated by the driver. When the deceleration operation is concluded, in a subsequent working step 21, the amount of the actual acceleration $|a_{act}|$ is determined. For this purpose, the speed or the rotational speed can be detected at two successive points in time and the acceleration can be determined therefrom. Advantageously, the amount of the actual acceleration $|a_{act}|$ is determined and is analyzed in the further program sequence. The determination and analysis of the amount of acceleration has the advantage that this computing step can be carried out without an additional software adaptation after a deceleration has taken place, as well as after an acceleration has taken place, whereby the extent of the software and the thus required storage capacity in the control unit is reduced. In a query 22, which follows, the amount of the actual acceleration $|a_{act}|$ is compared with the amount of a definable reference acceleration $|a_{ref}|$.

If the query 22 was answered with "no"; that is, the amount of the actual acceleration $|a_{act}|$ is larger than the amount of the definable reference acceleration $|a_{ref}|$, the no output of the query 22, by way of a connection 23, leads back to the working step 21, where the amount of the actual acceleration $|a_{act}|$ is again determined.

If the query 22 was answered with "yes"; that is, the amount of the actual acceleration $|a_{act}|$ is smaller than or equal to the amount of the definable reference acceleration $|a_{act}| \leq |_{ref}|$, the yes output of the query 22 leads by way of a connection 24 to a working step 25. In working step 25, the momentary speed $v_{mom}$ at the point in time when $|a_{act}| \leq |_{ref}|$ is detected and stored, so that now the momentary speed $v_{mom}$ is present in the control unit. In the subsequent working step 26, the momentary speed is acted upon by means of a speed offset, wherein: $v_{mom} + \Delta v = v_{des-new}$. This speed difference to be included, as a function of the operating point, can be determined, for example, in the application and can be stored in a corresponding characteristic diagram. At the conclusion of the process according to the invention, the new desired speed is slightly below the read-in momentary speed. Thus, it is achieved that, when driving uphill, there is a little less correction at an earlier point in time than when driving in a level plane. Up to another speed change, the newly determined desired speed will be the relevant controlled variable.

Figure 3:
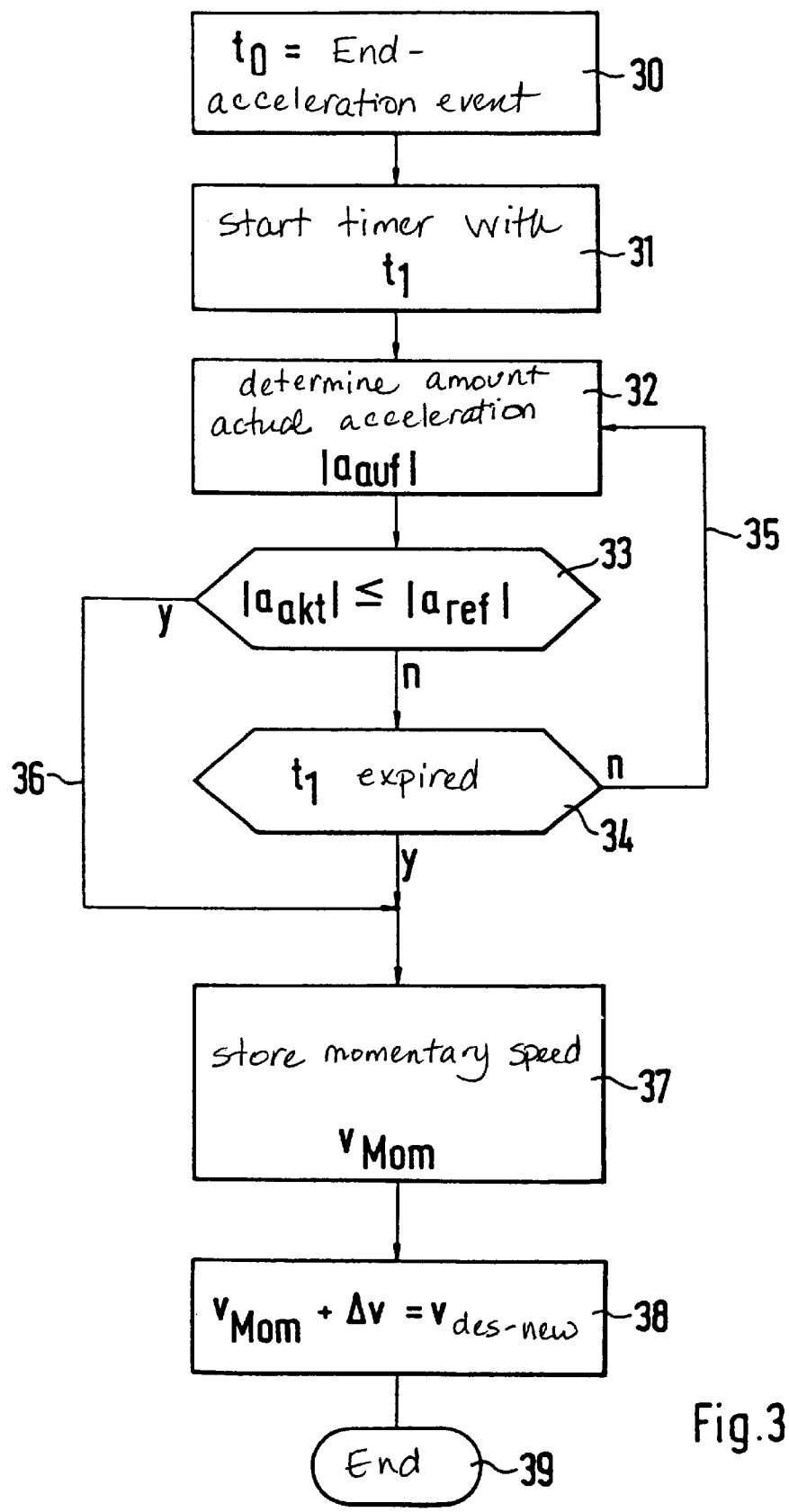
FIG. 3 is a flow chart illustrating the processing in the control unit at a positive acceleration.

The process according to the invention after an acceleration will now be explained by means of the flow chart of FIG. 3. In a working step 30, the conclusion of the acceleration event is first detected and thus the point in time $t_0$ is defined. The conclusion of the acceleration event is carried out analogous to the statements with respect to FIG. 2, i.e., by means of the monitoring of the pertaining operating unit BE, for example the accelerator pedal. After the conclusion of the acceleration operation, in a subsequent working step 31, a timer is started with a definable time $t_1$. This time $t_1$, can be defined, for example, as a function of the actual operating condition. This actual operating condition is defined by a detection of different operating parameters, such as the rotational speed, the load, the temperature and the pressure. In the case of an acceleration, particularly during steep downhill driving, the positive acceleration may not fall below the defined reference value. This ensures for a definable time period $t_1$ that the momentary speed is also detected as a new desired speed in the event that the amount of the acceleration does not fall below the corresponding reference value, which can occur, for example, in the coasting operation.

For starting a definable time period $t_1$, different known implementations exist which will not all be discussed here in detail. One of the simplest and most current variants is definitely the loading of a counter with the pertaining value for t1 and the subsequent counting down so that, at a zero count, the expired time is recognized and the corresponding actions are triggered. After the expiration of this definable time $t_1$, the amount of the actual acceleration is determined in the subsequent working step 32.

After the determination of the amount of the actual acceleration, in a subsequent query 33, a comparison is carried out between the amount of the actual acceleration and the amount of a definable reference acceleration. If the amount of the actual acceleration is larger than the amount of the definable reference acceleration, the no output of the query 33 leads to a subsequent query 34. Here, it is examined whether the time $t_1$, has expired. If this is not so, the no output of query 34 leads by way of a connection 35 back to the working step 32. If the query 23 was answered with "yes", that is, the amount of the actual acceleration is smaller than the amount of the reference acceleration, the yes output of the query 33 leads by way of a connection 36 to a working step 37. The yes output of the query 34 is also led to the working step 37. In query 34, it was examined whether the time $t_1$ has expired. By inserting this additional time loop, not all movements of the operating units are converted immediately which, in turn, ensures a driving operation which is quieter as a whole.

In working step 37, the momentary speed is detected and this value is led to a subsequent working step 28, in which the momentary speed $v_{mom}$ is acted upon by a speed difference $\Delta v$. This thus determined value is the new desired speed. In the case of the acceleration event, including an operating-point-dependent speed difference has the advantage that, during uphill driving, there is slightly less correcting at an earlier point in time than in the case of the movement of the motor vehicle in a level.

The newly determined desired speed is now used as the controlled variable for the superset processes of the cruise control. The process according to the invention is concluded in the final working step 39. A new start will occur after the driver of the vehicle has initiated and concluded a new acceleration event by operating and releasing the corresponding is operating unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for automatically controlling the vehicle speed of a motor vehicle, said vehicle speed being controlled to a definable desired speed ($V_{des}$) the process comprising the acts of:

canceling a controlling event when a speed change is initiated by a driver;

determining an amount of an actual acceleration ($|a_{act}|$) after the speed change initiated by the driver is concluded;

comparing the amount of the actual acceleration with an amount of a definable reference acceleration;

storing as a new desired speed ($v_{des-new}$), a momentary speed ($V_{mom}$) occurring at a point in time when the amount of the actual acceleration is less than or equal to the amount of the definable reference acceleration; and wherein after the conclusion of the speed change, the process further comprises the acts of:
   starting a definable time period; and
   after an expiration of the definable time period, determining the momentary speed as the new desired speed.

2. The process according to claim 1, further comprising the act of correcting the new desired speed as a function of detected operating parameters of the vehicle.

3. The process according to claim 2, wherein the conclusion of the speed change is detected by the act of:
   recognizing a release of an operating unit for the speed change and determining no new operation of the operating unit has taken place within a definable time period.

4. The process according to claim 2, wherein after the conclusion of the speed change, the process further comprises the acts of:
   starting a definable time period; and
   after an expiration of the definable time period, determining the momentary speed as the new desired speed.

5. The process according to claim 2, further comprising the acts of:
   acting upon the momentary speed by a definable speed difference to obtain an adaptively corrected speed; and
   storing the adaptively corrected speed as the new desired speed.

6. The process according to claim 1, wherein the conclusion of the speed change is detected by the act of:
   recognizing a release of an operating unit for the speed change and determining no new operation of the operating unit has taken place within a definable time period.

7. The process according to claim 6, further comprising the acts of:
   acting upon the momentary speed by a definable speed difference to obtain an adaptively corrected speed; and
   storing the adaptively corrected speed as the new desired speed.

8. The process according to claim 1, further comprising the acts of:
   acting upon the momentary speed by a definable speed difference to obtain an adaptively corrected speed; and
   storing the adaptively corrected speed as the new desired speed.

9. A computer product, comprising:
   a computer readable medium having stored thereon program code segments that:
     cancel a controlling event when a speed change is initiated by a driver;
     determine an amount of an actual acceleration ($|a_{act}|$) after the speed change initiated by the driver is concluded;
     compare the amount of the actual acceleration with an amount of a definable reference acceleration;
     store as a new desired speed ($v_{des-new}$), a momentary speed ($V_{mom}$) occurring at a point in time when the amount of the actual acceleration is less than or equal to the amount of the definable reference acceleration; and
   further comprising a program code segment that, after the conclusion of the speed change, starts a definable time period; and
     after an expiration of the definable time period, determines the momentary speed as the new desired speed.

10. The computer product according to claim 9, further comprising a program code segment that corrects the new desired speed as a function of detected operating parameters of the vehicle.

11. The computer product according to claim 9, further comprising a program code segment that detects the conclusion of the speed change by recognizing a release of an operating unit for the speed change and determining no new operation of the operating unit has taken place within a definable time period.

12. The computer product according to claim 9, further comprising a program code segment that:
   acts upon the momentary speed by a definable speed difference to obtain an adaptively corrected speed; and
   stores the adaptively corrected speed as the new desired speed.

13. A process for automatically controlling the vehicle speed of a motor vehicle, said vehicle speed being controlled to a definable desired speed ($v_{des}$), the process comprising the acts of:
   canceling a controlling event when a speed change is initiated by a driver;
   determining an amount of an actual acceleration ($|a_{act}|$) after the speed change initiated by the driver is concluded;
   comparing the amount of the actual acceleration with an amount of a definable reference acceleration;
   storing as a new desired speed ($v_{des-new}$), a momentary speed ($V_{mom}$) occurring at a point in time when the amount of the actual acceleration is less than or equal to the amount of the definable reference acceleration; and
   further comprising the acts of:
     acting upon the momentary speed by a definable speed difference to obtain an adaptively corrected speed; and
     storing the adaptively corrected speed as the new desired speed.

14. A computer product, comprising:
   a computer readable medium having stored thereon program code segments that:
     cancel a controlling event when a speed change is initiated by a driver;
     determine an amount of an actual acceleration ($|a_{act}|$) after the speed change initiated by the driver is concluded;
     compare the amount of the actual acceleration with an amount of a definable reference acceleration;
     store as a new desired speed ($V_{des-new}$), a momentary speed ($V_{mom}$) occurring at a point in time when the amount of the actual acceleration is less than or equal to the amount of the definable reference acceleration; and
   further comprising a program code segment that:
     acts upon the momentary speed by a definable speed difference to obtain an adaptively corrected speed; and
     stores the adaptively corrected speed as the new desired speed.

* * * * *